United States Patent [19]
Leuchten et al.

[11] Patent Number: 5,330,597
[45] Date of Patent: Jul. 19, 1994

[54] PROCESS FOR THE PREPARATION OF A VEHICLE WINDOW

[75] Inventors: William E. Leuchten, Mountain Lakes, N.J.; Henry W. Griffin, Bloomfield Hills, Mich.

[73] Assignee: Essex Specialty Products, Inc., Clifton, N.J.

[21] Appl. No.: 931,733

[22] Filed: Aug. 18, 1992

[51] Int. Cl.⁵ .............................................. B60J 10/02
[52] U.S. Cl. ..................................... 156/108; 156/102; 156/295; 156/71; 156/247; 156/250
[58] Field of Search .................. 156/99, 102, 106, 108, 156/101, 295, 292, 71, 247, 249, 250; 52/208, 397, 789, 743

[56] References Cited

U.S. PATENT DOCUMENTS

| | | |
|---|---|---|
| 3,155,204 | 11/1964 | Campbell et al. .................. 52/208 |
| 3,241,277 | 3/1966 | Coppock ........................... 156/108 X |
| 3,434,903 | 3/1969 | Hann ................................. 156/108 X |
| 3,654,005 | 4/1972 | Higgins et al. ...................... 156/108 |
| 3,968,612 | 7/1976 | Endo et al. ....................... 156/108 X |
| 4,059,469 | 11/1977 | Mattimoe et al. .................. 156/108 |
| 4,172,000 | 10/1979 | Horike et al. ...................... 156/108 |
| 4,284,751 | 8/1981 | Hutt et al. ........................... 528/45 |
| 4,551,372 | 11/1985 | Kunert ................................. 428/38 |
| 4,555,607 | 11/1985 | Roentgen et al. .................. 219/765 |
| 4,571,278 | 2/1986 | Kunert ............................... 156/108 |
| 4,704,175 | 11/1987 | Kunert et al. ................. 156/293 X |
| 4,758,648 | 7/1988 | Rizk et al. ............................ 528/53 |
| 4,853,055 | 8/1989 | Taylor ................................ 156/108 |
| 4,879,853 | 11/1989 | Braendle et al. ..................... 52/208 |

FOREIGN PATENT DOCUMENTS 2508267 12/1982 France .

Primary Examiner—Michael W. Ball
Assistant Examiner—Francis J. Lorin
Attorney, Agent, or Firm—Ann K. Galbraith; Norman L. Sims

[57] ABSTRACT

The invention is a process for preparing a prefabricated vehicle window comprising the sequential steps of:

(a) placing a cover film in a receptacle to provide a film cavity, with a portion of the cover film extending out of the receptacle, wherein the cavity is of a dimension sufficient to hold a bead of adhesive which would extend around the entire periphery of the window;

(b) depositing a bead of an uncured, deformable adhesive in the cavity on top of the cover film in an amount sufficient to slightly overfill the cavity; and (c) contacting the bead of adhesive with a vehicle window under conditions sufficient to press adhesive out of the cavity and between the vehicle window and the portion of the cover film extending over the sides of the receptacle such that the adhesive pressed out of the cavity bonds the film to the window along the edges of the bead of adhesive.

6 Claims, 1 Drawing Sheet

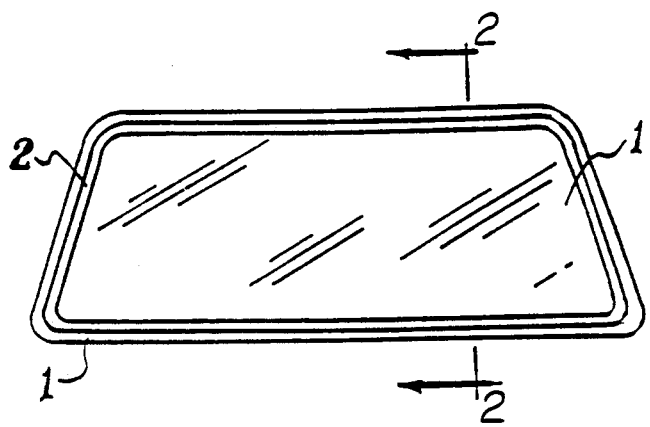
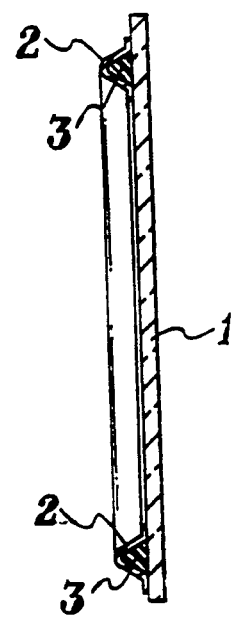
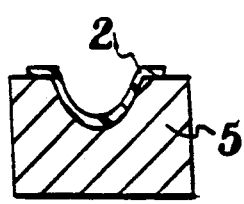
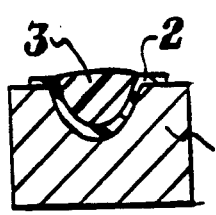
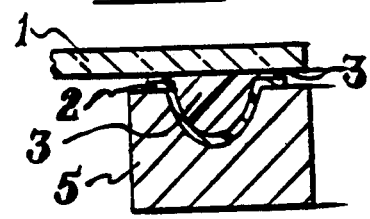
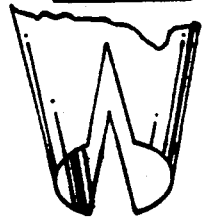

PROCESS FOR THE PREPARATION OF A VEHICLE WINDOW

BACKGROUND OF THE INVENTION

This invention relates to the mounting or installation of vehicle windows and, more specifically to vehicle windows which are mounted or installed through the use of an adhesive.

It is known to mount vehicle windows in a vehicle through the use of an adhesive such as, for example, a moisture-curable urethane adhesive. In such a mounting procedure, the edge of the window is glued to a flange of a vehicle body. In such procedures, however, it is usually necessary to apply the moisture-curable adhesive to the window just prior to the mounting of the window, since exposure to atmospheric moisture prior to mounting will, over a period of time, cause the adhesive to cure and lose its ability to bond effectively to the vehicle flange. However, if the adhesive is applied just prior to mounting of the window, the vehicle manufacturer must purchase, operate, and maintain a substantial amount of pumping and dispensing equipment, as well as store substantial quantities of the moisture-curable adhesive. In addition, in the case of automotive windshields, the vehicle manufacturer may also need to maintain a full line of pumping and dispensing equipment to apply one or more glass primers (usually a clear primer followed by a wiping operation, followed by the application of a "blackout" primer) to the glass surface prior to the application of the moisture-curable adhesive.

It is also known to pre-apply moisture curable adhesive to a window, and then cover the adhesive with moisture-proof foil in such a manner that the foil does not touch the bead of adhesive. The air enclosed in the foil is then evacuated and the package is filled with a dry protection gas. Upon application, the foil is completely removed to expose the uncured adhesive, as described in U.S. Pat. No. 4,879,853.

U.S. Pat. No. 4,879,853 also describes a process for pre-applying moisture curable adhesive to a window by first preparing a cured bead of adhesive adhered to the window in the shape of a receptacle for a second bead of uncured adhesive, placing a bead of moisture-curable adhesive in the receptacle which does not completely fill the receptacle, and then placing a covering over the receptacle which does not touch the uncured bead of adhesive. Upon application, the foil is completely removed from the receptacle to expose the uncured adhesive.

It would be desirable to develop a process for the pre-application of a moisture curable adhesive which does not require the use of protection gases or the removal of the cover foil during application, nor require the vehicle manufacturer to maintain a full line of pumping and dispensing equipment and a supply of adhesive and primers.

BRIEF DESCRIPTION OF THE DRAWINGS

FIG. 1 illustrates a view of the prefabricated vehicle window of the invention.

FIG. 2 illustrates a view in section of the prefabricated vehicle window of the invention.

FIG. 3 illustrates a view in section of a preferred embodiment of the prefabricated vehicle window of the invention.

FIGS. 4(a), (b), and (c) illustrate an embodiment of steps of the process of the invention.

FIG. 5 illustrates a nozzle for depositing a bead of adhesive in the process of the invention.

SUMMARY OF THE INVENTION

In one aspect, this invention is a process for preparing a prefabricated vehicle window comprising the sequential steps of:

(a) placing a cover film in a receptacle to provide a film cavity, with a portion of the cover film extending out of the receptacle;

(b) depositing a bead of an uncured, deformable adhesive in the cavity on top of the cover film in an amount sufficient to slightly overfill the cavity;

(c) contacting the bead of adhesive with a vehicle window under conditions sufficient to press adhesive out of the cavity and between the vehicle window and the portion of the cover film extending over the sides of the receptacle such that the adhesive pressed out of the cavity bonds the film to the window along the edges of the bead of adhesive.

In a second aspect, this invention is a prefabricated vehicle window comprising a vehicle window; and a substantially uncured, deformable bead of moisture-curable adhesive material extending along the periphery of the vehicle wherein the bead of adhesive is covered by, and substantially in contact with, a cover film which is adhesively secured to the vehicle window along the inboard and outboard edges of the bead of adhesive.

It has been discovered that the process of the invention provides a prefabricated vehicle window which does not require in its manufacture the use of a preformed adhesive receptacle adhered to the glassy nor the use of dry gases to prevent the adhesive from curing before it is applied to the vehicle flange. The vehicle window may be manufactured in a location remote from where it is to be installed in a vehicle, and does not require the vehicle manufacturer to maintain a full line of pumping and dispensing equipment and a supply of adhesive and primers.

DETAILED DESCRIPTION OF THE INVENTION

Suitable cover films for use in the process of the invention include any film which has a sufficiently low permeability to water vapor to prevent the exterior portion of a moisture-curable adhesive (the portion which would normally be exposed to air after deposition onto the vehicle window) contained in such film from curing or "skinning over" within about twenty-four hours of the completion of the process for making the prefabricated vehicle window. Preferably, the film has a sufficiently low permeability to water vapor to prevent such curing for at least about 7 days following the completion of the process for making the prefabricated vehicle window. Preferably, the film has a permeability to water vapor of less than about 300 g/100 in$^2$/h/ml at 39.5° C., more preferably less than about 50 g/100 in$^2$/h/ml at 39.5° C. Such films are also preferably thick and/or strong enough to not rupture during the process, but are thin and/or flexible enough to enable the film to conform to the dimensions of the cavity used in the process. Preferably, such films have a thickness in the range of from at least about 0.1 mil, more preferably at least about 0.5 mil; to no greater than about 10 mils, and more preferably no greater than about 1 mil. Preferably, the film has a tensile strength which is sufficient to prevent tearing of the film during the process for preparing the prefabricated vehicle window of the invention, and during handling of the window during storage and shipment, but may be cut easily to expose the adhesive without removing the film. The cover film may be comprised of several individual layers of film, which may also contain a metallized film layer to improve moisture barrier properties. Examples of such films include poly(vinylidene chloride) films, and polyester/metal laminate films, both available as Saran TM films from The Dow Chemical Company, and polyester films available from Courtauldes and Cadillac Plastics.

Suitable receptacles for holding the film include any receptacle which will provide, upon the insertion of a film, a film cavity with sufficient structural integrity to hold a bead of adhesive during the process for preparing the vehicle window of the invention. Preferably, the receptacle is constructed from a substantially rigid metal or molded plastic, and is part of a mold apparatus wherein the receptacle portion is shaped length-wise to match the periphery of the vehicle window, having dimensions which define the size and configuration of an adhesive bead to be applied to the vehicle window. The cover film may be placed in the cavity by any suitable meanst in order to line the shaped cavity with the cover film such that the cover film extends out of the cavity. In addition, the receptacle also preferably contains perforations which are connected to a vacuum and/or gas pressure system. Such a system is preferably arranged so that when a vacuum is applied on the outside of the receptacle to the perforations, the cover film placed in the cavity will assume the shape of the receptacle. Such a system may also be arranged so that when the film cavity is filled with adhesive and air pressure is applied on the outside of the receptacle to the perforations, the film containing the adhesive may be more easily removed from the receptacle.

The film cavity may be of any suitable size or linear dimension sufficient to hold a bead of adhesive sufficient in size to bond the vehicle window to a vehicle window flange. Preferably, the film cavity is of a dimension sufficient to hold a bead of adhesive which would extend around the entire periphery of the window. The cross-section of the film cavity may also be of any suitable shapes but is preferably substantially "V"-shaped as shown in FIG. 3 or "U"-shaped, as shown in FIG. 4, since such a shape has been discovered to allow the film to be more easily placed in the cavity near and around window corners. The bead of adhesive may be deposited in the cavity by any suitable means, such as adhesive extruders or dispensers commonly used in the application of urethane adhesives for vehicle window bonding applications and is preferably deposited in a nitrogen atmosphere to prevent the moisture curing of the adhesive. Preferably, the extrusion nozzle is preferably shaped as shown in FIG. 5. The bead of adhesive must be large enough to slightly overfill the cavity, and form a surface of exposed adhesive. By "slightly overfill," it is meant that there is sufficient adhesive in the cavity so that when the adhesive in the cavity is contacted with the vehicle window and the cavity and window are pressed towards each other, enough of the adhesive will be displaced out of the cavity between the vehicle window and the portion of the cover film extending over the sides of the receptacle, to effectively bond that portion of cover film to the vehicle window along the inboard and outboard edges of the bead of adhesive. Preferably, the bead of adhesive is also large enough to provide sufficient adhesion between the glass and a metal substrate, such as a window flange, after application of the vehicle window to the flange and curing of the adhesive. The bead of adhesive is preferably extruded in a roughly triangular shape or a "U" shaper with the height of the bead, and the width of the bead at the top of the receptacle in the range of from about 5 mm to about 5 cm, more preferably in the range of from about 14 to about 18 mm.

Suitable adhesives for use in the preparation of the prefabricated vehicle window of the invention include any moisture-curable adhesive which will effectively bond a vehicle window to a window flange. Preferably, the adhesive is a one-part urethane adhesive with excess isocyanate groups, which will cure in the presence of atmospheric moisture. Most preferably, the adhesive is a "fast cure"-type adhesive, prepared from a urethane prepolymer having an isocyanate functionality between 2.3 and 3.0 and a catalyst comprising either dimorpholinodiethyl ether or a mixture of organic tin and organic bismuth, as described in U.S. Pat. Nos. 4,758,648 and 4,284,751, which are hereby incorporated by reference in their entirety.

The adhesive in the prefabricated vehicle window of the invention is substantially uncured. By "substantially uncured," it is meant that the adhesive has not cured to the point at which it will no longer bond effectively with a metal window flange upon removal or cutting of the adhesive film and installation of the window.

The vehicle window may be of any suitable size or dimension, and may be comprised of any suitable material, such as glass or a polymeric material, such as polycarbonate. Preferably, the window is comprised of glass. In addition, the window also preferably has a layer of black ceramic coating along the edge of the window on the surface which is to be bonded to the flange, for styling or cosmetic reasons. It may also be preferable to apply a layer of a silane glass primer or "wipe," and/or a layer of a glass primer, which is preferably black, along the edge of the window on the surface which is to he bonded to the flange, to promote the adhesion of the window to the flange, and/or, in the case of a black primer, to provide protection from ultraviolet rays for the adhesive if an adhesive which needs such protection is used.

To contact the vehicle window with the bead of adhesive, the window may be placed on top of the receptacle holding the film and adhesive with enough force applied to press a portion of the adhesive overfill out of the film cavity and between the vehicle window and the portion of the cover film extending over the sides of the receptacle, to effectively bond that portion of cover film to the vehicle window along the inboard and outboard edges of the bead of adhesive.

The bead of adhesive is contacted with the vehicle window soon enough after its deposition in the cavity so that the bead is substantially uncured. Preferably, the bead of adhesive is substantially in contact with the cover film so that there is no air or moisture trapped between the film and uncured adhesive which would cause the adhesive to cure past the point where it is no longer substantially uncured and deformable.

In its second aspect, this invention is a prefabricated vehicle window comprising
 a vehicle window; and a substantially uncured, deformable bead of a moisture-curable adhesive material extending along the periphery of the vehicle window;

wherein the bead of adhesive is covered by, and substantially in contact with, a cover film which is adhesively secured to the vehicle window along the inboard and outboard edges of the bead of adhesive.

The prefabricated vehicle window of this aspect of the invention may be prepared by the process of the invention, as described above.

If a seal and/or decorative molding along the edge of the window is desired, such molding may be prefabricated separately in its desired shape and glued to the vehicle window, or may be fabricated by depositing a separate bead of hardenable adhesive material in the shape of the desired molding onto the vehicle window and allowing the bead to harden. Such a fabrication process occurs before the window is contacted with the bead of adhesive described in step (c) of the process of the invention. If the bead is fabricated from a bead of hardenable adhesive, the bead is deposited so that it partially extends over the edge of the vehicle window, as shown in FIG. 3, and may be positioned so that a portion of it is between the window and the layer of substantially uncured adhesive. In such a case, it is not necessary for the film which covers the uncured adhesive to be bonded to the vehicle window along the inboard and outboard sides of the bead of adhesive as described above in step (c) of the process of the invention, if it is effectively bonded to the hardened adhesive material to keep the uncured adhesive bead substantially uncured. The hardened bead also preferably has a substantially planar surface for contacting with the uncured bead of adhesive. Such a seal and/or molding will advantageously help prevent water from entering any gaps between the glass edge and the rabbet (the surface adjacent to the vehicle flange, which is roughly parallel to the edge of the glass, which connects the vehicle flange to the remainder of the vehicle frame), which would otherwise freeze in cold climates and exert a force on the glass edge. However, the molding, which is preferably flexible, is primarily a styling or cosmetic feature of the glass assembly which covers any gaps between the glass edge and rabbet.

The bead of hardenable adhesive material may comprise any substance which will form an elastomeric polymer bonded to the window upon curing, and able to bond with the bead of adhesive to be deposited on top of the polymer such as described, for example in U.S. Pat. No. 4,571,278, the relevant portions of which are hereby incorporated by reference. Preferably, the material is comprised of the same adhesive as the bead of adhesive which is to be deposited on top of the polymer. The bead of hardenable adhesive material is deposited on the window by any suitable means, such as extrusion, and is cured to form an elastomeric polymer by any suitable method, such as by exposure to atmospheric moisture or steam, prior to the deposition of the uncured bead of adhesive on top of the elastomeric polymer.

When the prefabricated vehicle window is to be bonded to the vehicle flange (that is, to the substrate which forms the vehicle window opening), it will be necessary to cut or remove the film in order to allow the adhesive to come into contact with the flange. For example, the film may be removed manually by pulling it off, although this method would be more labor-intensive than other possible methods (since the film is bonded to the glass) and therefore less desirable. This method is also less desirable since a portion of the uncured adhesive may cling to the film during removal of the film. The adhesive may also be exposed by manually or robotically cutting the film lengthwise, approximately along the middle of the bead of adhesive. The adhesive would then be placed against the flange, and the adhesive would be allowed to cure. Another method for "cutting" the film would be to place a wire along the bottom of the film cavity during the process for making the window, at least one end of which is kept outside the cover film, which could be pulled in a direction perpendicular to the glass along the adhesive bead to cut the film. When the film is cut to expose the adhesive, the film need not be otherwise removed from the window. The vehicle window may be contacted with the vehicle window flange by any suitable means, such as manually, or by robotic means.

Referring now to the drawings, FIG. 1 illustrates one embodiment of the prefabricated vehicle window of the invention. Vehicle window 1 is shown, with a layer of film 2 covering the bead of adhesive. FIG. 2 shows a cross section of the same window, including the bead of adhesive 3 which is covered by the film 2. FIG. 3 shows a cross section of a vehicle window prepared with a layer of an elastomeric polymer with a substantially planar top surface 4 between the vehicle window surface and the bead of adhesive. This elastomeric polymer provides a decorative rim around the edge of the window, and/or serves as a seal and/or reveal molding between the edge of the glass and the vehicle window opening after the vehicle window is installed. FIGS. 4(a), (b), and (c) illustrate an embodiment of the process of the invention and more clearly illustrates the interface between the bead and the film. FIG. 4(a) shows a cross section of a cover film 2 placed in a receptacle 5. FIG. 4(b) shows a cross section of a bead of adhesive 3 deposited in the cavity. FIG. 4(c) shows a cross section of the bead of adhesive contacted with a vehicle window. FIG. 5 illustrates a preferred nozzle for depositing a bead of adhesive in the process of the invention. The triangular cut-out portions on the side of the nozzle allow a tall bead of adhesive to be extruded inside the receptacle.

ILLUSTRATIVE EMBODIMENTS

The following examples are given to illustrate the invention and should not be interpreted as limiting it in any way.

EXAMPLE 1

A cover film (a polyvinylidene chloride film, sold as Saranex ™ SX-14 by The Dow Chemical Company) is placed in a receptacle as shown in FIG. 4(a). A bead of a moisture-curable urethane adhesive (sold as 58702 by Essex Specialty Products, Inc.) is deposited in the receptacle as shown in FIG. 4(b). A windshield is then placed on top of the receptacle as shown in FIG. 4(c). The windshield is then removed from the receptacle. The windshield will have attached to its periphery the bead of adhesive covered by the cover film which is secured to the windshield along the inboard and outboard edges of the bead of adhesive. When the windshield is to be installed, the cover film is cut to expose at least a portion of the Dead of adhesive along the entire periphery of the windshield, and the side of the windshield with the exposed bead of adhesive is placed against the flange surrounding the vehicle window opening. The adhesive is then allowed to cure.

EXAMPLE 2

Window Molding Example

A bead of hardenable adhesive is extruded along the periphery of a windshield, so that a portion of it extends over the edge of the windshield, and is cured to form a hardened bead of adhesive with a substantially planar top surface which extends over the edge of the windshield, as shown by numeral (4) in FIG. 3. In a separate operation, a cover film (a polyvinylidene chloride film, sold as Saranex ™ SX-14 by The Dow Chemical Company) is placed in a receptacle as shown in FIG. 4(a). A bead of a moisture-curable urethane adhesive (sold as 58702 by Essex Specialty Products, Inc.) is deposited in the receptacle as shown in FIG. 4(b). The windshield with the hardened bead of adhesive described above is then placed on top of the receptacle as shown in FIG. 4(c), so that the bead of uncured adhesive will be superpositioned on the portion of the hardened bead which is in contact with the windshield when the windshield is removed from the receptacle. The windshield is then removed from the receptacle. The windshield will have attached to its periphery the bead of adhesive covered by the cover film which is secured to the windshield or and/or the hardened bead of adhesive along the inboard and outboard edges of the uncured bead of adhesive. When the windshield is to be installed, the cover film is cut to expose at least a portion of the bead of adhesive along the entire periphery of the windshield, and the side of the windshield with the exposed bead of adhesive is placed against the flange surrounding the vehicle window opening and is positioned so that the molding substantially covers the gap between the edge of the glass and the vehicle rabbet. The adhesive is then allowed to cure.

What is claimed is:

1. A process for preparing a prefabricated vehicle window comprising the sequential steps of:
   (a) placing a cover film in a receptacle to provide a film cavity, with a portion of the cover film extending over the sides of the receptacle, wherein the cavity is of a dimension sufficient to hold a bead of adhesive which would extend around the entire periphery of the window;
   (b) depositing a bead of an uncured, deformable bead of adhesive in the cavity in an amount sufficient to slightly overfill the cavity; and
   (c) contacting the bead of adhesive with a vehicle window under conditions sufficient to press adhesive out of the cavity and between the vehicle window and the portions of the cover film extending over the sides of the receptacle in an amount sufficient to bond the film to the entire periphery of the window along the inboard and outboard edges of the bead of adhesive.

2. The process of claim 1 wherein the receptacle has a "U"-shaped cross section.

3. The process of claim 1 wherein the receptacle has a "V"-shaped cross section.

4. A process for preparing a prefabricated vehicle window comprising the sequential steps of:
   (a) placing a cover film in a receptacle to provide a film cavity, with a portion of the cover film extending over the sides of the receptacle, wherein the cavity is of a dimension sufficient to hold a bead of adhesive which would extend around the entire periphery of the window, and
   depositing a first bead of a hardenable adhesive material along the edge portion of one side of the vehicle window and allowing such bead to harden;
   (b) depositing a bead of an uncured, deformable bead of adhesive in the cavity in an amount sufficient to slightly overfill the cavity; and
   (c) contacting the bead of adhesive with one side of a vehicle window or the hardened adhesive material under conditions sufficient to press adhesive out of the cavity and between the vehicle window or the hardened adhesive material and the portions of the cover film extending over the sides of the receptacle in an amount sufficient to bond the film to the window or the hardened adhesive material along the entire periphery of the window along the inboard and outboard edges of the bead of adhesive.

5. The process of claim 1 wherein the receptacle has a "U"-shaped cross section.

6. The process of claim 1 wherein the receptacle has a "V"-shaped cross section.

* * * * *